US012657703B2

(12) United States Patent
Zhang

(10) Patent No.: US 12,657,703 B2
(45) Date of Patent: Jun. 16, 2026

(54) METHOD FOR CORRECTING IMAGE, ELECTRONIC DEVICE, AND STORAGE MEDIUM

(71) Applicant: SHANGHAI UNITED IMAGING HEALTHCARE CO., LTD., Shanghai (CN)

(72) Inventor: Zheng-Qiang Zhang, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 371 days.

(21) Appl. No.: 18/239,271

(22) Filed: Aug. 29, 2023

(65) Prior Publication Data

US 2024/0070857 A1     Feb. 29, 2024

(30) Foreign Application Priority Data

Aug. 29, 2022    (CN) .......................... 202211039053.5

(51) Int. Cl.
G06T 7/00          (2017.01)
G06T 5/73          (2024.01)
            (Continued)

(52) U.S. Cl.
CPC .............. G06T 7/0012 (2013.01); G06T 5/73 (2024.01); G06T 7/13 (2017.01); G06T 7/136 (2017.01);
            (Continued)

(58) Field of Classification Search
CPC .... G06T 2207/10081; G06T 5/73; G06T 7/20
See application file for complete search history.

(56) References Cited

U.S. PATENT DOCUMENTS 9,196,061  B2    11/2015  Hsieh et al.
2006/0069318 A1*  3/2006  Keaveny ................... G06T 7/97
                                                        703/11
(Continued)

FOREIGN PATENT DOCUMENTS

CN          106651985  A        5/2017
CN          107316277  A  *  11/2017  ............... G06T 7/11
(Continued)

OTHER PUBLICATIONS

Abdoli M, de Jong JR, Pruim J, Dierckx RA, Zaidi H. Reduction of artefacts caused by hip implants in CT-based attenuation-corrected PET images using 2-D interpolation of a virtual sinogram on an irregular grid. Eur J Nucl Med Mol Imaging. Dec. 2011;38(12):2257-68. (Year: 2011).*
(Continued)

*Primary Examiner* — Gandhi Thirugnanam

(57) ABSTRACT

A method and an apparatus for correcting an image, an electronic device, and a non-transitory computer-readable storage medium. The method includes following steps. Initial data are acquired, and an initial image is generated to be processed based on the initial data. The initial image is preprocessed to generate a first image, and the first image includes multiple types of image regions. First data are generated based on the first image, and second data are generated based on the first data and the initial data. A second image is generated based on the second data.

17 Claims, 5 Drawing Sheets

(51) Int. Cl.

| | |
|---|---|
| *G06T 7/13* | (2017.01) |
| *G06T 7/136* | (2017.01) |
| *G06T 7/20* | (2017.01) |
| *G06T 7/30* | (2017.01) |

(52) U.S. Cl.
CPC .................. *G06T 7/20* (2013.01); *G06T 7/30* (2017.01); *G06T 2207/10081* (2013.01); *G06T 2207/30016* (2013.01)

(56) References Cited

U.S. PATENT DOCUMENTS

| | | | | |
|---|---|---|---|---|
| 2012/0213327 A1* | 8/2012 | Boas | .................... | G06T 5/70 378/5 |
| 2014/0212011 A1* | 7/2014 | Ye | ...................... | G06T 12/10 382/131 |
| 2015/0254841 A1* | 9/2015 | Fujiwara | .............. | A61B 6/5205 382/128 |
| 2016/0007948 A1* | 1/2016 | Isola | ..................... | A61B 6/032 382/131 |
| 2017/0281112 A1* | 10/2017 | Pack | .................... | A61B 6/5264 |
| 2022/0327692 A1* | 10/2022 | Park | .................... | G06T 5/73 |
| 2024/0070857 A1* | 2/2024 | Zhang | ................... | G06T 7/136 |

FOREIGN PATENT DOCUMENTS

| | | | | |
|---|---|---|---|---|
| CN | 109118555 A | | 1/2019 | |
| CN | 109961491 A | | 7/2019 | |
| CN | 105488823 B | | 10/2019 | |
| CN | 111223156 A | | 6/2020 | |
| CN | 111369635 A | | 7/2020 | |
| CN | 111815730 A | * 10/2020 | ............. | G06V 10/25 |
| CN | 112562030 A | | 3/2021 | |
| CN | 112767265 A | * 5/2021 | ............. | G06T 7/136 |
| CN | 115423705 A | * 12/2022 | ............. | G06T 15/50 |
| KR | 20160087784 A | * 7/2016 | ........... | A61B 6/5205 |

OTHER PUBLICATIONS

Zhang, Yuan, and Liyi Zhang. 2019. "A Rigid Motion Artifact Reduction Method for CT Based on Blind Deconvolution" Algorithms 12, No. 8: 155. (Year: 2019).*

Wang J, Wang S, Chen Y, Wu J, Coatrieux JL, Luo L. Metal artifact reduction in CT using fusion based prior image. Med Phys. Aug. 2013;40(8) (Year: 2013).*

Chinese Office Action (Application No. 2022110390535) , dated Jun. 10, 2025, 8 pages.

* cited by examiner

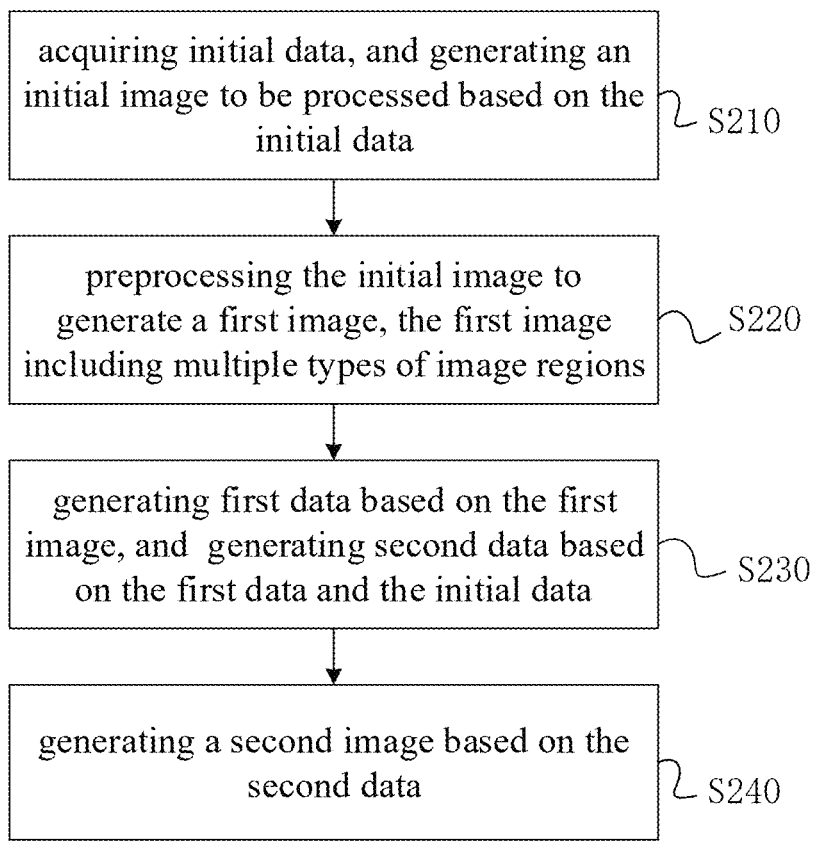

```
┌─────────────────────────────────────┐
│ acquiring initial data, and generating an │
│ initial image to be processed based on the │ ⎰ S210
│           initial data              │
└─────────────────────────────────────┘
                  │
                  ▼
┌─────────────────────────────────────┐
│   preprocessing the initial image to   │
│   generate a first image, the first image │ ⎰ S220
│ including multiple types of image regions │
└─────────────────────────────────────┘
                  │
                  ▼
┌─────────────────────────────────────┐
│   generating first data based on the first │
│ image, and generating second data based │ ⎰ S230
│    on the first data and the initial data  │
└─────────────────────────────────────┘
                  │
                  ▼
┌─────────────────────────────────────┐
│  generating a second image based on the │ ⎰ S240
│            second data             │
└─────────────────────────────────────┘
```

FIG. 2

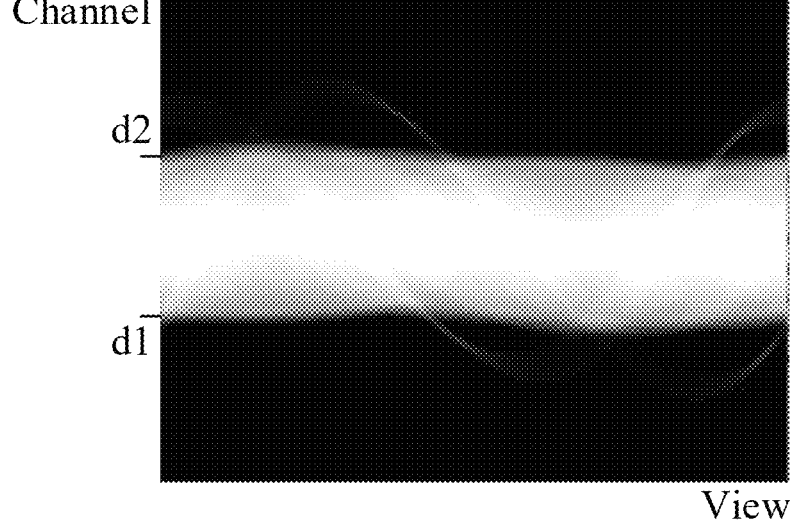

FIG. 3

Artifact

Artifact

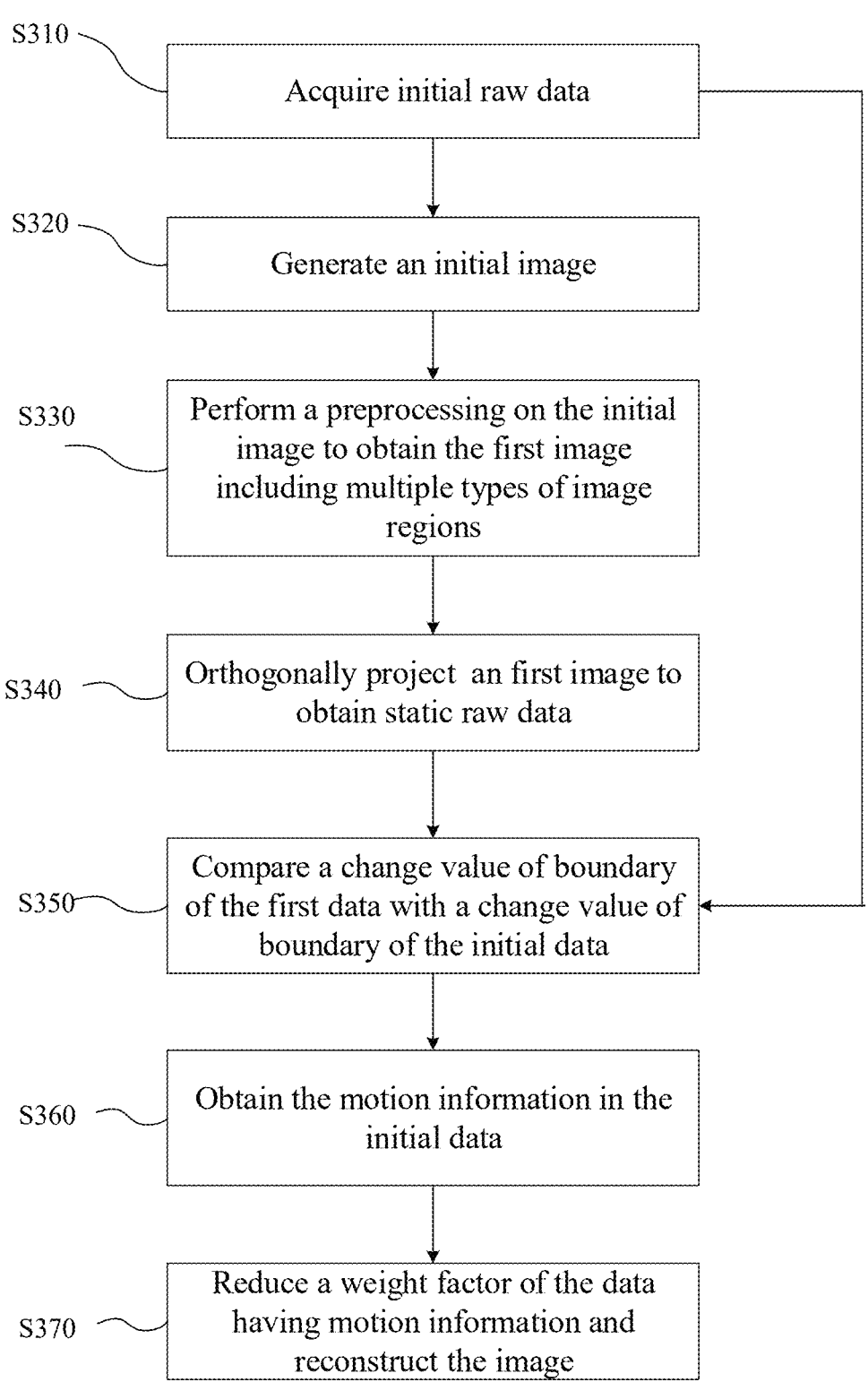

S310   Acquire initial raw data

S320   Generate an initial image

S330   Perform a preprocessing on the initial image to obtain the first image including multiple types of image regions S340   Orthogonally project an first image to obtain static raw data S350   Compare a change value of boundary of the first data with a change value of boundary of the initial data S360   Obtain the motion information in the initial data S370   Reduce a weight factor of the data having motion information and reconstruct the image

FIG. 5

METHOD FOR CORRECTING IMAGE, ELECTRONIC DEVICE, AND STORAGE MEDIUM

CROSS REFERENCE TO RELATED APPLICATION

The present application claims priority to Chinese Patent Application No. 202211039053.5, filed on Aug. 29, 2022, entitled "METHOD AND APPARATUS FOR CORRECTING MOTION ARTIFACT IN IMAGE, ELECTRONIC DEVICE, AND STORAGE MEDIUM", which is incorporated herein by reference in its entirety.

TECHNICAL FIELD

The present application relates to the technical field of medical image processing, and more particularly, to a method for correcting an image.

BACKGROUND

In a clinical diagnosis and radiotherapy, motion artifacts often occur in an image due to motion. For example, during signal acquisition of the computerized tomography (CT), bar-shaped artifacts or arc-shaped artifacts distributed along the phase encoding direction are generated due to an autonomous motion, a non-autonomous motion of the human body, or a pulse of vessel. Strength of the motion artifacts is related to magnetic field strength, a motion amplitude and a motion direction.

SUMMARY

In the present disclosure, a method for correcting an image, an electronic device, and a non-transitory computer-readable storage medium are provided.

In a first aspect, in an embodiment of a method for correcting an image of the present disclosure is provided. The method includes the following steps. Initial data are acquired, and an initial image is generated to be processed based on the initial data. The initial image is preprocessed to generate a first image, and the first image includes multiple types of image regions. First data are generated based on the first image, and motion artifacts are corrected based on the first data and the initial data to generate second data. A second image is generated based on the second data.

In some embodiments, the preprocessing the initial image includes an image segmentation, and the image segmentation includes performing a segmentation processing on the initial image based on a segmentation threshold. The segmentation threshold includes a first segmentation threshold and a second segmentation threshold. The multiple types of image regions include a first type of image region, a second type of image region, and a third type of image region.

In some embodiments, the preprocessing the initial image includes a homogenization processing for CT values, and the homogenization processing for the CT values includes homogenizing the CT values of all pixels of the same type of image region.

In some embodiments, the method further includes sharpening the first image before the generating the first data based on the first image.

In some embodiments, the generating the second data based on the first data and the initial data includes the following steps. Motion information in the initial data is determined according to a change value of boundary of the first data and a change value of boundary of the initial data. The motion artifacts are corrected to generate the second data according to the motion information in the initial data, the first data, and the initial data.

In some embodiments, the motion information includes motion intensity. The generating the second data according to the motion information in the initial data, the first data, and the initial data, includes the following steps. The first data and the initial data are weighted according to the motion intensity of the initial data, and the weighted first data and the weighted initial data are summed up to obtain the second data. A weight factor of the first data is positively correlated with the motion intensity, and a weight factor of the initial data is negatively correlated with the motion intensity.

In some embodiments, the determining the motion information in the initial data according to the change value of boundary of the first data and the change value of boundary of the initial data includes: comparing a gradient in a channel direction of the first data with a gradient in a channel direction of the initial data, and determining the motion information in the initial data based on a comparison result.

In some embodiments, the generating the second data based on the first data and the initial data, includes: registering the initial data based on the first data, and generating the second data based on the registered initial data.

In some embodiments, the registering the initial data based on the first data, and generating the second data based on the registered initial data, includes following steps. A two-dimensional view of the first data is formed by combining the first data in a view direction and in a channel direction, and a two-dimensional view of the initial data is formed by combining the initial data in a view direction and in a channel direction. An offset vector between the two-dimensional view of the initial data and the two-dimensional view of the first data is determined by taking the two-dimensional view of the first data as a reference. The two-dimensional view of the initial data is non-rigidly registered to a space, in which the two-dimensional view of the first data is located, by using a non-rigid registration algorithm, and a two-dimensional view of the second data is obtained. The second data is obtained based on the two-dimensional view of the second data.

In some embodiments, the first segmentation threshold is greater than the second segmentation threshold. CT values of the first type of image region are larger than or equal to the first segmentation threshold. CT values of the second type of image region are larger than the second segmentation threshold and smaller than the first segmentation threshold. CT values of the second type of image region are smaller than or equal to the second segmentation threshold.

In some embodiments, the first type of image region is a bone image region, the second type of image region is a soft tissue image region, and the third type of image region is the air image region. The preprocessing the initial image further includes a homogenization processing, and the homogenization processing includes following steps. The CT values of the bone image region are homogenized as a first CT value. The CT values of the soft tissue image region are homogenized as a second CT value. The CT values of the air image region are homogenized as a third CT value.

In some embodiments, the first CT value is greater than the second CT value, the second CT value is greater than the third CT value.

In a second aspect, the embodiment of the present disclosure provides an apparatus for correcting an image. The apparatus includes an image acquisition module, an image segmentation module, a data generation module, and an image generation module.

The image acquisition module is configured to acquire initial data, and generate an initial image to be processed based on the initial data.

The image segmentation module is configured to preprocess the initial image to generate a first image. The first image includes multiple types of image regions, the multiple types of image regions constituting a first image.

The data generation module is configured to generate first data based on the first image, and correct motion artifacts based on the first data and the initial data to generate second data.

The image generation module is configured to generate a second image based on the second data.

In a third aspect, an embodiment of the present disclosure provides an electronic device is provided. The electronic device includes a memory and a processor. The memory has a computer program stored thereon, and the processor, when executing the computer program, is configured to perform the method for correcting the image according to the above first aspect.

In some embodiments, the electronic device further includes a transmission device and an I/O device. The transmission device is connected to the processor, and the I/O device is connected to the processor.

In a fourth aspect, an embodiment of the present disclosure provides a non-transitory computer-readable storage medium, having a computer program stored thereon. The computer program, when executed by a processor, causes the processor to perform steps of the method for correcting the image according to the above first aspect.

Compared with the related art, the method for correcting the image provided in the embodiments, through the above steps, firstly the initial data are acquired, and the initial image to be processed is generated based on the initial data. The initial image is then preprocessed to obtain the first image. The first image includes the multiple types of image regions, and the image region of the same type is uniform. The motion artifacts in the first image are reduced or eliminated, while partial detailed features therein are missing. Then the first data are generated based on the first image, and the motion artifacts are corrected according to the first data and the initial data, to generate the second data. Finally, the second image, in which the motion artifacts are corrected, is generated according to the second data, and therefore the motion artifacts are corrected at the level of the raw data to reduce the effects of the motion artifacts. The second image combines the advantages of the first image and the initial image. The method of the embodiment of the present disclosure retains the detailed features of the initial image as much as possible while correcting the artifacts in the initial image, especially the motion artifacts in the initial image, solves a problem in the related art that the motion artifacts in the image cannot be corrected safely and stably, and achieves the technical effects of safely and stably correcting the motion artifacts in the image.

The details of one or more embodiments of the present disclosure are proposed in the following accompanying drawings and description below, in order to make other features, objectives, and advantages of the present disclosure more concise and to be better understood.

BRIEF DESCRIPTION OF THE DRAWINGS

The accompanying drawings illustrated herein are used to provide a further understanding of the present disclosure, and form a part of the present disclosure. Exemplary embodiments and the description thereof in the present disclosure are used to explain the present disclosure, but not intended to limit the present disclosure improperly. In the accompanying drawings:

FIG. 2 is a flow chart of the method for correcting the image according to an embodiment of the present disclosure.

FIG. 3 is a two-dimensional view formed by combining a view direction and a channel direction of data according to an embodiment of the present application.

FIG. 5 is a flow chart of the method for correcting the image according to another embodiment of the present disclosure.

DETAILED DESCRIPTION OF THE EMBODIMENTS

In order to make the objectives, technical solutions and advantages of the present disclosure clearer and to be better understood, the present disclosure is described and illustrated below with reference to the accompanying drawings and embodiments.

Unless defined otherwise, technical terms or scientific terms involved in the present disclosure shall have the general meaning understood by those of ordinary skill in the art to which the present disclosure belongs. The terms "a", "an", "the", "these", and the like in the present disclosure do not indicate a limitation in number, and they may be singular or plural. The terms "include", "comprise", "have" and any variations thereof, as involved in the present disclosure, are intended to cover non-exclusive inclusion. For example, a process, a method, a system, a product, or a device, each of which includes a series of steps or modules (units), is not limited to listed steps or modules (units), but may include steps or modules (units) not listed, or may include other steps or modules (units) inherent to the process, the method, the product or the device, respectively. The terms "connect" "link" "couple", and the like, which are involved in the present disclosure, are not limited to physical or mechanical connections, but may include electrical connections, whether direct connections or indirect connections. As involved in the present disclosure, "multiple" refers to two or more. The description "and/or" describes an association relationship of the associated objects, and indicates three relationships, i.e., the presence of A alone, the presence of both A and B, and the presence of B alone. In general, the character "/" indicates that previous and later objects associated are in an "or" relationship. The terms "first", "second", "third", and the like, as involved in the present disclosure, are used only to distinguish similar objects, and do not represent a specific ordering of the objects.

In the related art, a method for correcting motion artifact may be implemented by increasing a scan angle (e.g., with a scan angle of 420 degrees) to reduce effects of a motion artifact, which may increase the radiation dose and thus make the patient exposed to large radiation. Although a solution based on artificial intelligence can obtain an image with good effect, an uncontrollable result may occur in the clinical image for lack of training data and a theoretical basis.

In view of a problem in the related art that the motion artifact in the image cannot be corrected safely and stably, the present disclosure provides a method and an apparatus for correcting the image, an electronic device, and a storage medium.

Figure 1:
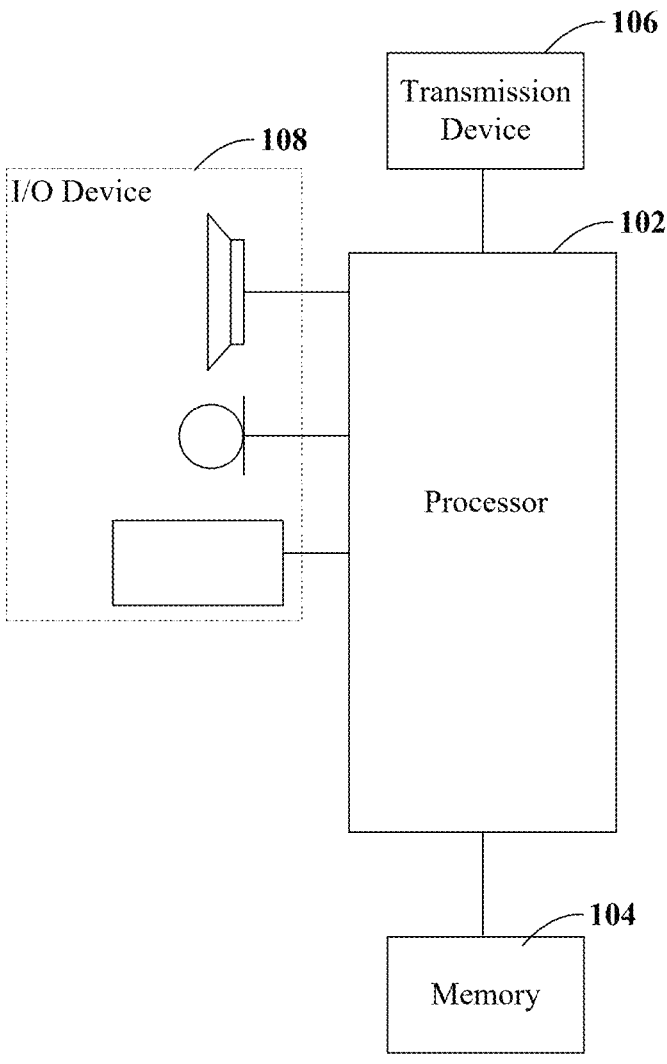
FIG. 1 is a structural block diagram illustrating a hardware of a terminal for implementing a method for correcting an image according to an embodiment of the present disclosure.

The method for correcting the image provided in embodiments of the present disclosure may be implemented by a terminal, a computer, or a similar computing device. In an embodiment, the method is implemented by the terminal. FIG. 1 is a structural block diagram showing a hardware of a terminal for implementing the method for correcting the image according to an embodiment of the present disclosure. As shown in FIG. 1, the terminal may include one or more (only one is shown in FIG. 1) processors 102 and one or more (only one is shown in FIG. 1) memories 104. The processor 102 may include, but not limited to, a microprocessor MCU or programmable logic device FPGA, or the like. The terminal may also include a transmission device configured to implement communication of the processor 102 with other external networks or external devices to receive and transmit data, and an I/O device 108. It should be understood by those of ordinary skill in the art that the structure shown in FIG. 1 is only illustrative and does not limit the structure of the above terminal. For example, the terminal may also include more or fewer components than those shown in FIG. 1, or have a different configuration from that shown in FIG. 1.

The memory 104 may be configured to store a computer program, for example, a software program and module of an application software, and for example, a computer program corresponding to the method for correcting the image according to an embodiment of the present disclosure. By running the computer program stored on the memory 104, the processor 102 executes various functional application and data processing, that is, implements the above method. The memory 104 may include a high-speed random access memory, and may also include a non-transitory memory, such as one or more magnetic storage devices, a flash memory, or other non-transitory solid state memory. In some embodiments, the memory 104 may further include memories disposed remotely relative to the processor 102, and these remote memories may be connected to the terminal by a network. Examples of the above network includes, but not limited to, the Internet, an intranet, a local area network, a mobile communication network, or any combination thereof.

The transmission device 106 is configured to receive or transmit data through the network. The above network includes a wireless network provided by a communication provider of the terminal. In an embodiment, the transmission device 106 includes a Network Interface Controller (NIC), which may be connected to other network devices through a base station, so as to communicate with the Internet. In an embodiment, the transmission device 106 may be a Radio Frequency (RF) module which is configured to communicate with the Internet wirelessly.

An embodiment of the present disclosure provides a method for correcting an image. FIG. is a flow chart of the method for correcting the image according to an embodiment of the present disclosure, as shown in FIG. 2, the method includes the following steps S210 to S240.

In step S210, initial data are acquired, and an initial image to be processed is generated based on the initial data.

In some embodiments, an image processing apparatus acquires the initial data, and generates the initial image to be processed based on the initial data. The initial image is generated by the unprocessed initial data, that is, the initial image refers to an image that has not been processed, and there is some degree of motion artifacts in the initial image to be processed. The objective of the method of this embodiment is to reduce the motion artifacts in the initial image.

In step S220, the initial image is preprocessed to generate a first image including multiple types of image regions.

In some embodiments, after acquiring the initial image, the image processing apparatus performs a preprocessing on the initial image. In particular, a segmentation is performed on the initial image according to a threshold, that is, a threshold segmentation is performed. The threshold segmentation is a region-based image segmentation technique, the principle of which is to divide pixels in the image into several categories. In some embodiments, in this step, since different types of objects are included in the initial image, the segmentation threshold may be determine based on the objects in the initial image, so as to perform the segmentation based on the segmentation threshold. Illustratively, in a common medical image, three types of objects, i.e., bone, soft tissue and air, are generally included, and two segmentation thresholds, which are critical values for segmenting the three types of objects, may be determined according to the three types of objects. Based on the two segmentation thresholds, the initial image is then segmented into three types of image regions, which correspond to bone, soft tissue, and air, respectively. It should be noted that there are different types of soft tissues in different scanning sites. Therefore, in a specific segmentation, the two segmentation thresholds need to be adjusted appropriately according to the specific types of soft tissues. In some embodiments, a plurality of image regions may belong to the same type of image region, and a type of image region may include only one image region, which are not limited herein. In some embodiments, the preprocessing further includes a homogenization processing, to homogenize the CT values of the pixels of each image region obtained by segmentation. That is, after a homogenization processing is performed, the CT values of the pixels of the image region of the same type are identical, so that each of the image regions in the initial image are uniform, thereby eliminating or reducing the motion artifacts that may exist in each of the image regions.

In an embodiment, the image region of the same type has the same display information, and the display information includes a CT value of the initial image.

In some embodiments, the image processing apparatus performs segmentation on the initial image based on determined segmentation thresholds, to obtain the multiple types of image regions. Further, the homogenization processing is performed on the CT values of the pixels of each image region obtained by segmentation, so that the image region of the same type has the same display information. The display information refers to the CT value. In the threshold segmentation of the medical image, since different types of objects in the image have different CT values, the segmentation may be performed according to a CT value difference of different parts in the image, and the segmentation threshold refers to a preset CT value. The preprocessing being performed on the initial image means that the image is first segmented into the multiple types of image regions according to the difference between the CT values, then the CT values of the image region of the same type are homogenized, thereby obtaining the multiple types of image regions. By homogenizing the CT values of the pixels of the image region of the same type, the image region of the same type becomes uniform, so that the motion artifacts in each image region may be eliminated or reduced. After the initial image is preprocessed, the first image is obtained.

In step S230, first data are generated based on the first image, and second data are generated based on the first data and the initial data.

In some embodiments, in step S220, the image processing apparatus preprocesses the initial image and obtains the first image. The first image includes multiple types of image regions, and the image region of the same type has the same display information, and accordingly are uniformly displayed. The motion artifacts in the first image are reduced or eliminated, therefore the first image may be used as a reference image for a subsequent image processing. In some embodiments, the first image is orthogonally projected to generate the first data, which are raw data constituting the first image. The motion artifacts are then corrected based on the initial data and the first data, to generate the second data. The second data are raw data in which the motion information is reduced or eliminated.

It should be further noted that, the first image obtained in step S220 is also an image in which the motion artifacts are reduced or eliminated, but the CT values of each the image region are homogenized, therefore partial detailed features are missing, and the first image cannot be used as a target image. In step S230, based on the first data and the initial data, the image processing is performed at raw data level to generate the second data, so that the detailed features of the initial image are retained as much as possible while the motion artifacts are reduced or eliminated.

In step S240, a second image is generated based on the second data.

In some embodiments, the image processing apparatus generates the second image based on the second data after obtaining the second data. The second data are raw data in which the motion information is reduced or eliminated, and in which the detailed features in the initial image are retained. The second data are obtained according to the first data and the initial data, and makes full use of the information in the initial data and the first data. The second image combines the advantages of the first image and the initial image. Compared with the initial image the second image has less motion artifacts, and compared with the first image, the second image has more image details, thereby obtaining the second image, in which the motion artifacts are reduced or eliminated, and in which a certain number of detailed features are obtained. The second image is the target image obtained according to the method of this embodiment.

Through the above steps, the image processing apparatus first acquires the initial data, and generates the initial image to be processed based on the initial data. The initial image is then preprocessed to obtain the first image. The first image includes the multiple types of image regions, and the image region of the same type is uniform. The motion artifacts in the first image are reduced or eliminated, while partial detailed features therein are missing. Then the first data are generated based on the first image, and the motion artifacts are corrected according to the first data and the initial data, to generate the second data. Finally, the second image, in which the motion artifacts are corrected, is generated according to the second data, and therefore the motion artifacts are corrected at the level of the raw data to reduce the effects of the motion artifacts. The second image combines the advantages of the first image and the initial image. The method of the embodiment of the present disclosure retains the detailed features of the initial image as much as possible while correcting the artifacts in the initial image, especially the motion artifacts in the initial image, solves a problem in the related art that the motion artifacts in the image cannot be corrected safely and stably, and achieves the technical effects of safely and stably correcting the motion artifacts in the image.

In some embodiments, in the segmentation of the preprocessing for the initial image, the segmentation threshold includes a first segmentation threshold and a second segmentation threshold. The initial image is segmented into multiple types of image regions according to the first segmentation threshold and the second segmentation threshold, and the multiple types of image regions include a first image region, a second image region and a third image region.

In some embodiments, the image to be segmented, namely the initial image, mainly contains three types of objects, and thus needs to be segmented into three types of image regions. Exemplarily, when the initial image contains three types of objects, i.e., bones, soft tissues, and air, the image segmentation is performed according to the CT values of these objects. Firstly, the first segmentation threshold and the second segmentation threshold are determined, both of which are specific CT values determined by the objects. Generally, a CT value of the bone is larger than a CT value of the soft tissue, and the CT value the soft tissue is larger than a CT value of the air, so that a lower limit value of the CT value range of the bone may be used as the first segmentation threshold, and an upper limit value of the CT value range of the air may be used as the second threshold. During the threshold segmentation, an image region whose CT values are greater than or equal to the first segmentation threshold is segmented as a bone image region, an image region whose CT values are less than or equal to the second segmentation threshold is segmented as an air image region, and an image region whose CT values are less than the first segmentation threshold and greater than the second segmentation threshold is segmented as a soft tissue image region. Further, in the homogenization processing of the preprocessing for the initial image, the CT values of the bone image region may be homogenized as a first CT value to obtain the first image region, where the first CT value is determined from the CT value range of the bone. The CT values of the soft tissue image region may be homogenized as a second CT value to obtain the second image region, where the second CT value is determined from the CT value range of the soft tissue. The CT values of the air image region may be homogenized as a third CT value to obtain the third image region) In an embodiment, the third CT value is zero. Thus, three types of uniform image regions can be obtained. Further, the first CT value and the second CT value are not constant and may be adjusted according to actual conditions. For example, a body bone and a skull are different in bone edges due to bone hardening, so the CT values of the two kinds of bones are different, and thus the first CT value may be adaptively modified according to the specific kind of the bone (the skull or the body bone) in the image. And for example, CT values of muscle and fat may be different, so that the second CT value may be adaptively modified according to the specific composition of the soft tissue in the image, such as the muscle, or the fat.

In some embodiments, before the step S230 of generating the first data based on the first image and generating the second data based on the first data and the initial data, the method for correcting the image further includes: sharpening the first image.

In some embodiments, the first image includes multiple types of image regions, and there are boundaries between different types of image regions. The boundaries between the different types of image regions may be enhanced by sharpening the first image, thereby improving a contrast between the first data and the initial data.

In some embodiments, the generating second data based on the first data and the initial data in the step S230, specifically includes step S231 and step S232.

In step S231, motion information in the initial data is determined according to a change value of boundary of the first data and a change value of boundary of the initial data. The motion information may be some abnormal data caused by a motion (e.g., a physiological motion).

In step S232, the motion artifacts are corrected to generate the second data according to the motion information in the initial data, the first data, and the initial data.

In some embodiments, a gradient in a channel direction of the first data is compared with a gradient in a channel direction of the initial data to determine a view in which the motion artifacts exist. FIG. 3 is a two-dimensional view formed by combining a view direction and a channel direction of data according to an embodiment of the present application. For example, as shown in FIG. 3, if a coordinate value in channel direction of a view of the initial data jumps from d1=50 to d2=500, while a coordinate value in channel direction of a view of the first data jumps from d1=20 to d2=470, then the view is misaligned, which means there is motion information in the view. In some embodiments, the view direction is a scanning direction. By means of the above comparison method, the view data having the motion information in the initial data may be determined, accordingly, the motion information in the initial data is acquired. Finally, according to the motion information in the initial data, and based on the first data and the initial data, the motion artifacts are corrected to generate the second data.

In some embodiments, the motion information includes motion intensity, and the step S232 of generating the second data according to the motion information in the initial data, the first data and the initial data specifically includes weighting the first data and the initial data and summing the weighted first data and the initial data up to obtain the second data according to the motion intensity of the initial data.

A weight factor of the first data is positively correlated with the motion intensity in the initial data, and a weight factor of the initial data is negatively correlated with the motion intensity in the initial data. In some embodiments, through the above comparison between the change values of boundary, not only can the view data having motion information be found in the initial data, but also the motion intensity in the initial data can be determined according to the misalignment of the view having motion information, therefore the motion information includes the motion intensity. When generation of the second data, the second data is obtained by weighting the first data and the initial data and summing them up according to the motion intensity in the initial data. The greater the view motion intensity in the initial data is, the more severe the motion artifacts in the initial image are, therefore the second data needs to be closer to the first data, so as to better correct the motion artifacts, accordingly, the weight factor of the first data is larger. The lower the motion intensity in the view is, the slighter the motion artifacts in the initial image are, therefore the second data needs to be closer to the initial data, so as to better retain the detailed features of the image, accordingly, the weight factor of the initial data is larger. As can be seen from the above description, in the actual operation, the weight factors of the first data and the initial data need to be adjusted according to the motion intensity in the initial data. It should be noted that a method for qualitatively determining the weight factors has been provided above. In some embodiments, weight factor needs to be determined according to the actual situations. In the same actual situation, the adaptive adjustment may also be performed, and there is no unique quantitatively calculating method.

In the above embodiments, a method for generating the second data at the level of the raw data is provided, the second data may be obtained by registering the initial data, in addition to weighting the first data and the initial data and summing them up.

In some embodiments, the generating second data based on the first data and the initial data in the step S230, specifically includes registering the initial data based on the first data, and generating the second data based on the registered initial data.

In this embodiment, the registration is performed based on a two-dimensional view formed by combining a view direction and a channel direction of the initial data, and a two-dimensional view formed by combining a view direction and a channel direction of the first data, and then an image registration is performed on the two-dimensional views. In some embodiments, an offset vector between the two-dimensional view of the initial data and the two-dimensional view of the first data is determined by taking the two-dimensional view of the first data as a reference, then the two-dimensional view of the initial data is non-rigidly registered to the space in which the two-dimensional view of the first data is located by using a non-rigid registration algorithm, therefore the two-dimensional view of the second data is obtained, finally the second data having little or no motion information is obtained, and the second image, in which the motion artifacts are reduced or eliminated, is obtained. In this embodiment, the motion intensity in the initial data is reduced mainly by the non-rigid registration algorithm. It should be noted that the non-rigid registration algorithm in this embodiment may be a common non-rigid registration algorithm in the related art, and the registration process is a common non-rigid registration process in the related art, which will not be described in detail in this embodiment. The core of this embodiment is to perform the non-rigid registration on a phase diagram of the initial data by taking a phase diagram of the first data as a reference image, thereby obtaining the second data in which the motion artifacts are corrected.

Figures 4A, 4B:
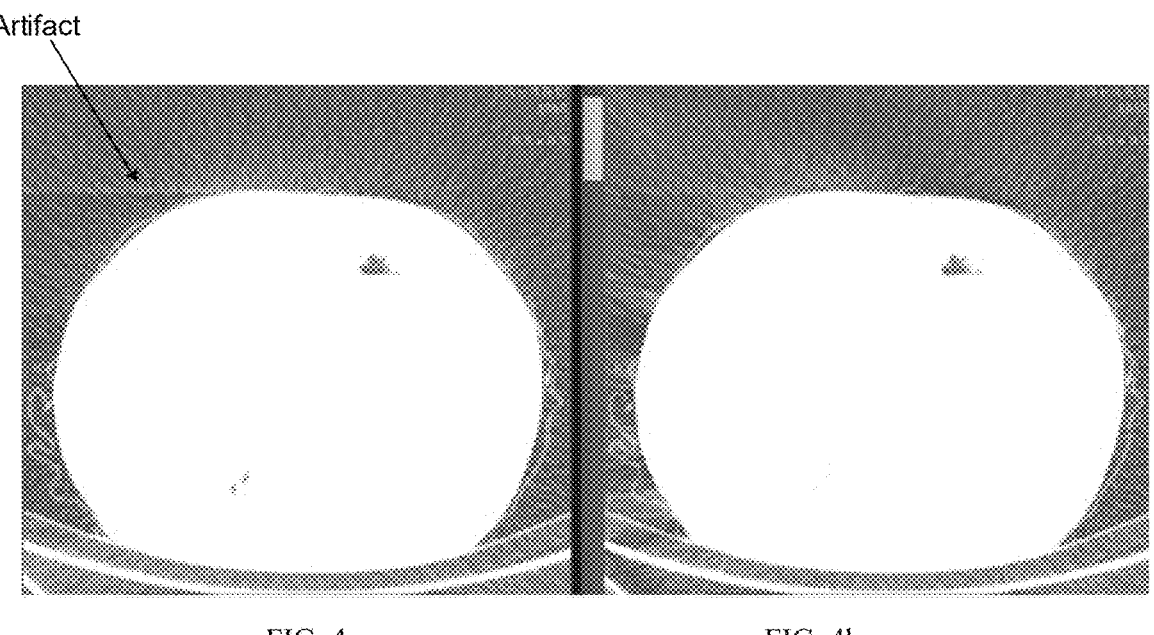
FIG. 4a shows an image obtained without performing the method for collecting image of the present application and viewed through an air window.
FIG. 4b shows a second image obtained according to an embodiment the present application and viewed through the air window.
Figures 4C, 4D:
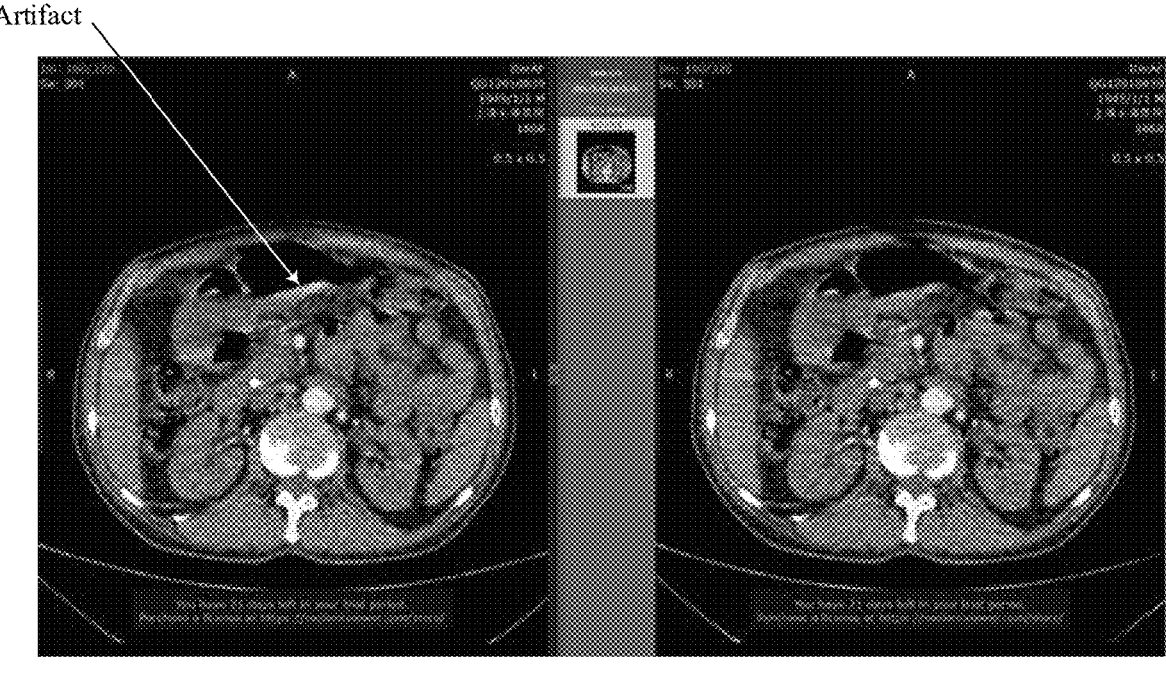
FIG. 4c shows another image obtained without performing the method for collecting image of the present application and viewed through a soft tissue window.
FIG. 4d shows a second image obtained according to the embodiment the present application and viewed through the soft tissue window.

FIG. 4a shows an image obtained without performing the method for collecting image of the present application and viewed through an air window, FIG. 4b shows a second image obtained according to an embodiment the present application and viewed through the air window, FIG. 4c shows another image obtained without performing the method for collecting image of the present application and viewed through a soft tissue window, and FIG. 4d shows a second image obtained according to the embodiment the present application and viewed through the soft tissue window. As viewed through the air window, an artifact obviously occurs in FIG. 4a, while in FIG. 4b obtained by performing the method of correcting image of the present application, the artifact is reduced greatly. As viewed through the soft tissue window, another artifact obviously occurs in FIG. 4c, while in FIG. 4d obtained by performing the method of correcting image of the present application, the other artifact is eliminated. Therefore, the method of the present application solves the problem in the related art that the artifacts in the image cannot be corrected safely and stably, and achieves the technical effects of safely and stably correcting the artifacts in the image.

The technical solution of the present disclosure will be further described hereinafter through specific embodiments.

FIG. 5 is a flow chart of the method for correcting the image according to another embodiment of the present disclosure. As shown in FIG. 5, the method for correcting the image includes the following steps S310 to S370.

In step S310, initial data are acquired.

In step S320, an initial image is generated.

In some embodiments, the initial image is generated based on the initial data, where, the initial image has the motion artifacts, and is an image to be processed.

In step S330, a preprocessing is performed on the initial image to obtain the first image including multiple types of image regions.

In some embodiment, the preprocessing includes a threshold segmentation and a homogenization processing of CT values. The initial image having the motion artifacts is segmented into three types of image regions, i.e., soft tissue image region, bone image region and air image region, and the homogenization processing is performed on the CT values of the initial image having the three types of image regions to obtain the first image.

In some embodiments, in order to make the boundaries between different types of image regions clearer, an image enhancement processing is performed on the first image. In some embodiments, the image enhancement processing is sharpening image. Through the preprocessing including the threshold segmentation, the homogenization processing, and the sharpening, which are performed on the initial image having the motion artifacts, the contour clarity of the boundary is enhanced, therefore the image is segmented into the common soft tissue image region, the bone image region, and the air image region according to the thresholds. The image is segmented into three types of image regions based on the thresholds and the three types of image regions are homogenized as follows.

CT value (bp>=first segmentation threshold)=A

CT value (second segmentation threshold<bp<first segmentation threshold)=B

CT value (bp=<second segmentation threshold)=C

Where, bp represents the CT value of the object in the image, A represents a homogenized CT value of the bone image region, B represents a homogenized CT value of the soft tissue image region, and C represents a homogenized CT value of the air image region. The image is segmented into the air image region, the soft tissue image region and the bone image region, whose CT values are homogenized respectively by these three equations, so that some motion artifacts are eliminated. The first equation represents that the CT values of the bone image region, which are larger than or equal to the first segmentation threshold, are homogenized as A. The second equation represents that the CT values of the soft tissue image region, which are larger than the second segmentation threshold and smaller than the first segmentation threshold, are homogenized as B. The third equation represents that the CT values of the air image region, which are smaller than or equal to the second segmentation threshold, are homogenized as C. In some embodiments, $C \leq 0$.

The first segmentation threshold and/or the second segmentation threshold above may be adaptively modified if the object constitution to be reconstructed is known in advance. In some embodiments, for example, the CT values of muscle and fat may be different, therefore the first segmentation threshold and the second segmentation threshold for segmenting the muscle and the fat may be different. For example, the CT values of the human body bone and the CT values of the head bone may be different due to different bone edges caused by bone hardening, which may also result in different first segmentation thresholds.

In some embodiments, the enhancement processing (in particular, the sharpening) is performed on the image including three types of image regions to obtain the first image having a clear contour of boundary between image regions. The first image is a reference static image.

In step S340, the first image is orthogonally projected to obtain static raw data (i.e., the first data). Through the image preprocessing, the motion artifacts of the objects to be reconstructed may be eliminated or reduced. The contrast of the boundaries of the image obtained by orthographic projection is improved by sharpening the image. The first image obtained by preprocessing may be used as a criterion of the orthographic projection. In some embodiments, the first image is orthogonally projected to obtain the static raw data, i.e., the first data.

In step S350, a change value of boundary of the first data is compared with a change value of boundary of the initial data.

In step S360, the motion information in the initial data is obtained.

In step S370, a weight factor of the data having motion information is reduced and the image is reconstructed.

In some embodiments, in the above steps S350 to S360, a gradient in a channel direction of the above static raw data (i.e., the first data) and is compared with a gradient in the channel direction of the initial data, so as to determine the data having the motion information in the initial data, and the initial data and the first data are weighted and summed to obtain the second data in which the motion artifacts are corrected.

For example, as shown in FIG. 3, if a coordinate value in channel direction of a view of the initial data jumps from d1=50 to d2=500, while a coordinate value in channel direction of a view of the static raw data jumps from d1=20 to d2=470, then the view is misaligned, and there are motion artifacts in the view.

Assuming that a represents the static raw data (i.e., the first data), and b represents the initial data, and the weight factor weight is generated according to the motion intensity determined above, and may be related to the motion intensity. A final corrected relational expression is: $c=a \times weight+(1-weight) \times b$, where, c represents the obtained second data in which the motion artifacts are corrected, where the greater the motion intensity is, the larger the weight factor weight is.

Finally, the image (i.e., the second image), in which the motion artifacts are corrected, is reconstructed based on the second data in which the motion artifacts are corrected.

It should be further noted that, the second data, in which the motion artifacts are corrected, may be obtained by registering the initial data based on the reference of the first data in addition to by the above steps. The registration is to find out an offset vector of the initial and the first data based on sinograms of the first data and sinograms of the initial data, and finally to obtain the second data in which the motion information is reduced.

In some embodiments, an apparatus for correcting an image is further provided. The apparatus is configured to implement the above embodiments and the preferred embodiments, which have been described already and will not be repeated. The terms "module", "unit", "subunit", and the like described herein may be a combination of software and/or hardware capable of realizing predetermined functions. Although the apparatus described in the following embodiments is preferably implemented by software, it may be implemented or contemplated by hardware, or a combination of software and hardware.

Figure 6:
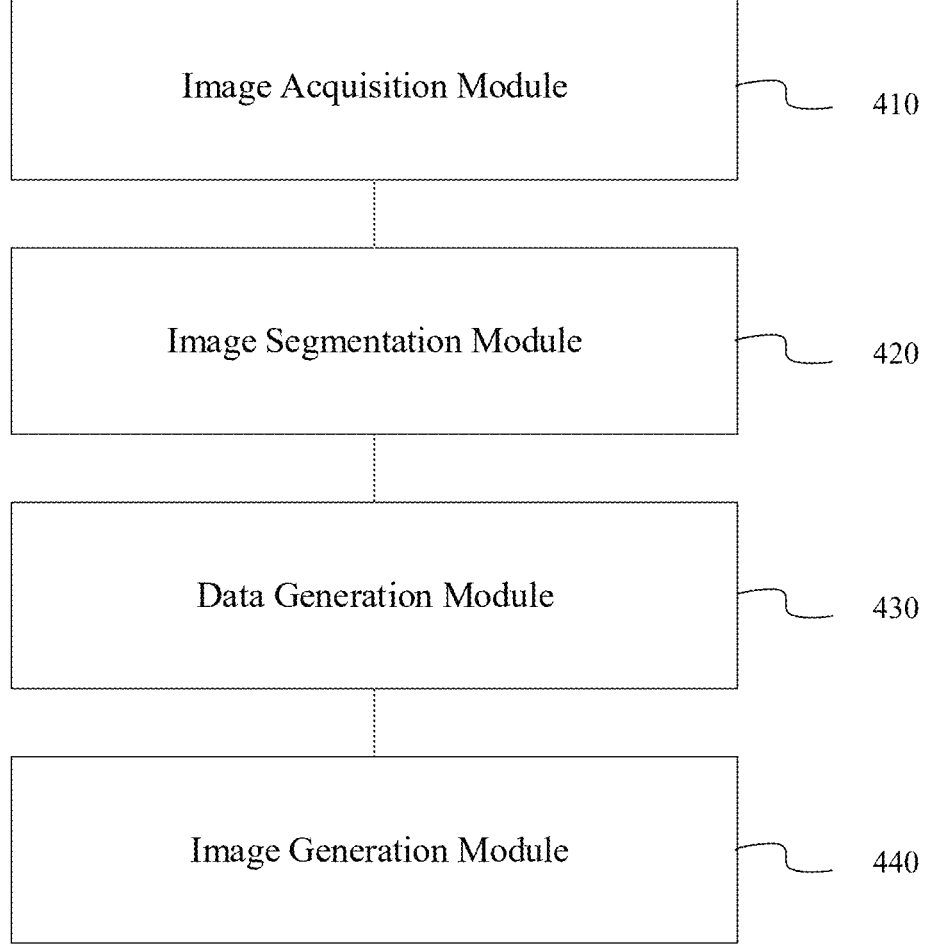
FIG. 6 is a structural block diagram illustrating an apparatus for correcting an image according to an embodiment of the present disclosure.

FIG. 6 is a structural block diagram illustrating an apparatus for correcting an image according to an embodiment of the present disclosure. As shown in FIG. 6, the apparatus includes an image acquisition module 410, an image segmentation module 420, a data generation module 430, and an image generation module 440.

The image acquisition module 410 is configured to acquire initial data, and generate an initial image to be processed based on the initial data.

The image segmentation module 420 is configured to preprocess the initial image to generate a first image including multiple types of image regions.

The data generation module 430 is configured to generate first data based on the first image, and correct motion artifacts based on the first data and the initial data, to generate second data.

The image generation module 440 is configured to generate a second image based on the second data.

With the cooperation of the above modules, the image processing apparatus first acquires the initial data, and generates the initial image to be processed based on the initial data. Then the initial image is preprocessed to obtain the first image. The first image includes the multiple image regions, and the image region of the same type is uniform. The motion artifacts in the first image are reduced or eliminated, while the partial detailed features therein are also missing. Then the first data is generated by the first image, the motion artifacts are corrected based on the first data and the initial data, to generate the second data. Finally, the second image, in which the motion artifacts are corrected, is generated based on the second data. Therefore, the motion artifacts are corrected at the level of the raw data, thereby reducing the effects of the motion artifacts. The second image combines the advantages of the first image and initial image. The apparatus according to the embodiments of the present disclosure, retains detailed features of the initial image as much as possible while correcting the motion artifacts in the initial image.

It should be noted that, the above modules may be functional modules or program modules, and may be implemented by software or hardware. For modules implemented by the hardware, all of the modules above may be arranged in the same processor, or each of the modules may be arranged in different processors in a manner of any combination.

An embodiment provides an electronic device, including a memory and a processor. The memory has a computer program stored thereon. The processor, when executing the computer program, is configured to implement the steps in any one of the above method embodiments.

In some embodiments, the above electronic device may further include a transmission device and an I/O device. The transmission device is connected to the processor, and the I/O device is connected to the processor.

In some embodiments, the above processor may be configured to perform the following steps S1 to S4 by means of the computer program.

In step S1, initial data is obtained, and an initial image to be processed is generated based on the initial data.

In step S2, the initial image is preprocessed to generate a first image including multiple types of image regions.

In step S3, first data are generated based on the first image, and second data are generated based on the first data and the initial data.

In step S4, a second image is generated based on the second data.

It should be noted that, for specific embodiments in this embodiment, reference may be made to embodiments described above and examples in alternative embodiments, which are not repeated in this embodiment.

In addition, in combination with the method for correcting the image provided in the above embodiments, a non-transitory computer-readable storage medium may be further provided in this embodiment. A computer program is stored on the non-transitory computer-readable storage medium. The computer program, when executed by a processor, causes the processor to implement any one of the methods for correcting the image in the above method embodiments.

It should be noted that the user information (including, but not limited to, user equipment information, user personal information, and the like) and data (including, but not limited to, data for analysis, stored data, displayed data, and the like) involved in the present disclosure are information and data that are authorized by the user or sufficiently authorized by all parties.

It should be understood that the specific embodiments described herein are merely illustrative of this application but not intended to limit it. According to the embodiments provided in the present disclosure, all other embodiments obtained by those of ordinary skill in the art without involving any inventive efforts fall within the protection scope of the present disclosure.

Obviously, the accompanying drawings are merely some examples or embodiments of the present disclosure, and it is also possible for those of skilled in the art to apply the present disclosure to other similar situations in accordance with these drawings without involving any inventive efforts. In addition, it should be understood that although the work done in this development process may be complex and time-consuming, certain modifications in design, manufacture, or production, etc. made in accordance with the technical contents of the present disclosure are merely conventional technical means for those of ordinary skill in the art, and should not be construed as insufficient in the present disclosure.

The term "embodiment" in the present disclosure means that specific features, structure, or characteristics described in combination with the embodiments may be included in at least one embodiment of the disclosure. The appearance of this term at various locations in the specification does not necessarily imply the same embodiment, nor does it imply that the embodiment and other embodiments are mutually exclusive and thus the embodiment is independent or alternative. It should be clearly or implicitly understood by those of ordinary skill in the art that the embodiments described in the present disclosure each may be combined with other embodiments if no confliction occur.

What is claimed is:

1. A method for correcting an image, comprising:
acquiring initial data, and generating an initial image to be processed based on the initial data;
preprocessing the initial image to generate a first image, the first image comprising multiple types of image regions;
generating first data based on the first image, and generating second data based on the first data and the initial data; and
generating a second image based on the second data;
wherein the generating the second data based on the first data and the initial data comprises:
determining motion information in the initial data according to a change value of boundary of the first data and a change value of boundary of the initial data; and
generating the second data according to the motion information in the initial data, the first data, and the initial data.

2. The method for correcting the image according to claim 1, wherein:
the preprocessing the initial image comprises an image segmentation, and the image segmentation comprises performing a segmentation processing on the initial image based on a segmentation threshold, the segmentation threshold comprises a first segmentation threshold and a second segmentation threshold; and
the multiple types of image regions comprise a first type of image region, a second type of image region, and a third type of image region.

3. The method for correcting the image according to claim 2, wherein the preprocessing the initial image comprises a homogenization processing for CT values, and the homogenization processing for the CT values comprises homogenizing the CT values of all pixels of the same type of image region.

4. The method for correcting the image according to claim 2, further comprising:
sharpening the first image before the generating the first data based on the first image.

5. The method for correcting the image according to claim 1, wherein,
the motion information comprises motion intensity;
the generating the second data according to the motion information in the initial data, the first data, and the initial data, comprises:
weighting the first data and the initial data according to the motion intensity of the initial data, and summing the weighted first data and the weighted initial data up to obtain the second data;
wherein a weight factor of the first data is positively correlated with the motion intensity, and a weight factor of the initial data is negatively correlated with the motion intensity.

6. The method for correcting the image according to claim 1, wherein the determining the motion information in the initial data according to the change value of boundary of the first data and the change value of boundary of the initial data comprises:
comparing a gradient in a channel direction of the first data with a gradient in a channel direction of the initial data; and
determining the motion information in the initial data based on a comparison result.

7. The method for correcting the image according to claim 2, wherein:
the first segmentation threshold is greater than the second segmentation threshold;
CT values of the first type of image region are larger than or equal to the first segmentation threshold;
CT values of the second type of image region are larger than the second segmentation threshold and smaller than the first segmentation threshold; and
CT values of the second type of image region are smaller than or equal to the second segmentation threshold.

8. The method for correcting the image according to claim 7, wherein:
the first type of image region is a bone image region, the second type of image region is a soft tissue image region, and the third type of image region is an air image region;
the preprocessing the initial image further comprises a homogenization processing, and the homogenization processing comprises:
homogenizing the CT values of the bone image region as a first CT value;
homogenizing the CT values of the soft tissue image region as a second CT value; and
homogenizing the CT values of the air image region as a third CT value.

9. The method for correcting the image according to claim 8, wherein:
the first CT value is greater than the second CT value; and
the second CT value is greater than the third CT value.

10. The method for correcting the image according to claim 9, further comprising:
adjusting the first CT value and the second CT value according to actual conditions.

11. An electronic device, comprising a memory and a processor, wherein, the memory has a computer program stored thereon, and the processor, when executing the computer program, is configured to perform steps of the method of claim 1.

12. The electronic device according to claim 11, further comprising a transmission device and an I/O device, wherein the transmission device is connected to the processor, and the I/O device is connected to the processor.

13. A non-transitory computer-readable storage medium, having a computer program stored thereon, wherein the computer program, when executed by a processor, causes the processor to perform steps of:
acquiring initial data, and generating an initial image to be processed based on the initial data;
preprocessing the initial image to generate a first image, the first image comprising multiple types of image regions;
generating first data based on the first image, and generating second data based on the first data and the initial data; and
generating a second image based on the second data;
wherein the generating the second data based on the first data and the initial data comprises:
determining motion information in the initial data according to a change value of boundary of the first data and a change value of boundary of the initial data; and
generating the second data according to the motion information in the initial data, the first data, and the initial data.

14. The non-transitory computer-readable storage medium according to claim 13, wherein, the motion information comprises motion intensity;

the generating the second data according to the motion information in the initial data, the first data, and the initial data, comprises:

weighting the first data and the initial data according to the motion intensity of the initial data, and summing the weighted first data and the weighted initial data up to obtain the second data;

wherein a weight factor of the first data is positively correlated with the motion intensity, and a weight factor of the initial data is negatively correlated with the motion intensity.

15. The non-transitory computer-readable storage medium according to claim 13, wherein the generating the second data based on the first data and the initial data, comprises:

registering the initial data based on the first data, and generating the second data based on the registered initial data.

16. The non-transitory computer-readable storage medium according to claim 15, wherein the registering the initial data based on the first data, and generating the second data based on the registered initial data, comprise:

forming a two-dimensional view of the first data by combining the first data in a view direction and in a channel direction, and forming a two-dimensional view of the initial data by combining the initial data in a view direction and in a channel direction;

determining an offset vector between the two-dimensional view of the initial data and the two-dimensional view of the first data by taking the two-dimensional view of the first data as a reference; registering the two-dimensional view of the initial data is non-rigidly to a space in which the two-dimensional view of the first data is located by using a non-rigid registration algorithm, and obtaining a two-dimensional view of the second data; and obtaining the second data based on the two-dimensional view of the second data.

17. A method for correcting an image, comprising:

acquiring initial data, and generating an initial image to be processed based on the initial data;

preprocessing the initial image to generate a first image, the first image comprising multiple types of image regions;

generating first data based on the first image, and generating second data based on the first data and the initial data; and generating a second image based on the second data;

wherein the generating the second data based on the first data and the initial data comprises: registering the initial data based on the first data, and generating the second data based on the registered initial data;

wherein registering the initial data based on the first data and generating the second data based on the registered initial data comprise:

forming a two-dimensional view of the first data by combining the first data in a view direction and in a channel direction, and forming a two-dimensional view of the initial data by combining the initial data in a view direction and in a channel direction;

determining an offset vector between the two-dimensional view of the initial data and the two-dimensional view of the first data by taking the two-dimensional view of the first data as a reference; registering the two-dimensional view of the initial data non-rigidly to a space, in which the two-dimensional view of the first data is located, by using a non-rigid registration algorithm, and obtaining a two-dimensional view of the second data; and obtaining the second data based on the two-dimensional view of the second data.

* * * * *